May 7, 1935.  G. GORTON  2,000,838
SWINGABLE SUPPORT FOR ENGRAVING MACHINE CUTTER HEADS
Filed Sept. 22, 1933    2 Sheets-Sheet 1

Inventor
George Gorton

By
Hubert E. Peck  Attorney

May 7, 1935. G. GORTON 2,000,838
SWINGABLE SUPPORT FOR ENGRAVING MACHINE CUTTER HEADS
Filed Sept. 22, 1933 2 Sheets-Sheet 2
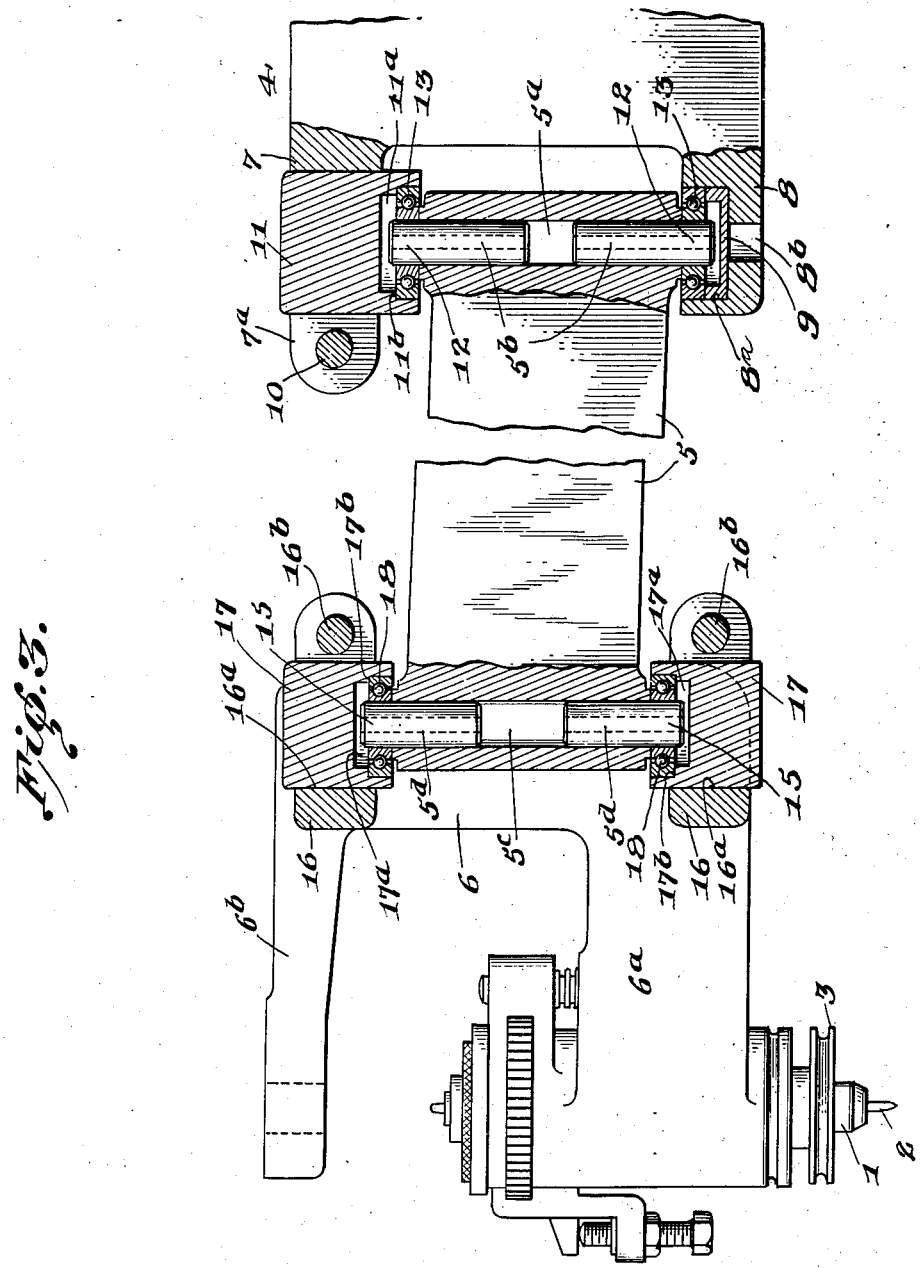

Patented May 7, 1935

2,000,838

UNITED STATES PATENT OFFICE 2,000,838

SWINGABLE SUPPORT FOR ENGRAVING MACHINE CUTTER HEADS

George Gorton, Racine, Wis.

Application September 22, 1933, Serial No. 690,612

7 Claims. (Cl. 308—2)

This invention relates to certain improvements concerning swingable supports for engraving machine cutter heads; and the objects and nature of the invention will be understood by those skilled in the art in light of the following explanations of the accompanying drawings that illustrate the preferred mechanical expression or embodiment of the invention from among other forms, constructions and combinations within the spirit and scope of the invention.

An object of the invention is to provide an improved linkage support for machine cutter heads that are swingable laterally over the work, with the ends in view of simplification and economy in construction, facilitating assembly and dis-assembly, and adjustability, and accuracy in operation.

With the foregoing, and other objects in view, the invention consists in certain novel features, organizations, and combinations, as more fully explained and specified hereinafter.

Referring to the accompanying drawings, forming part hereof:

Fig. 3 is an enlarged detail sectional elevation of the cutter head supporting linkage of Figs. 1 and 2.

Figure 1:
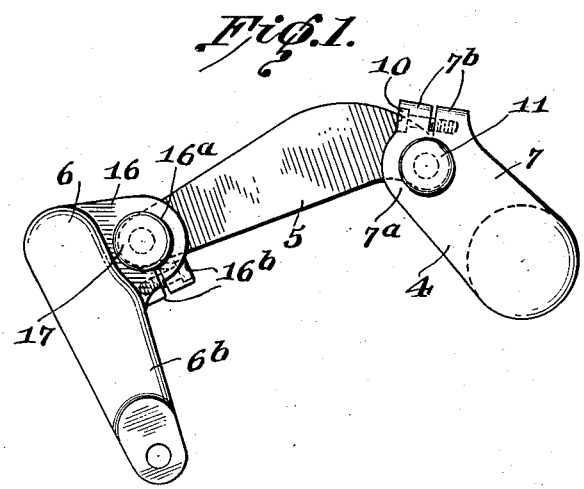
Fig. 1 is a top plan showing in part an engraving machine, more or less diagrammatically.
Figure 2:
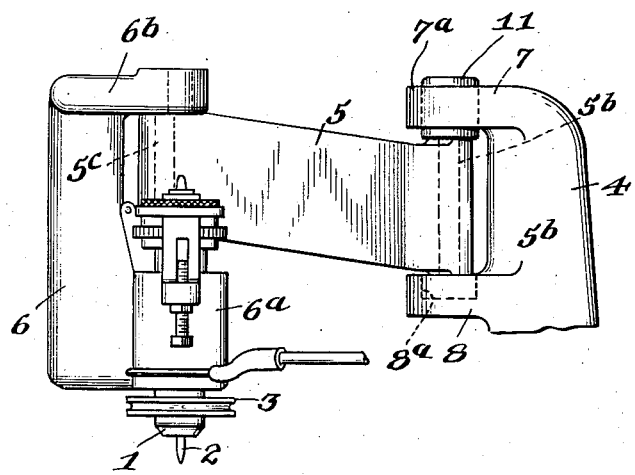
Fig. 2 is a side elevation of the partial engraving machine, organization of Fig. 1.

Certain types of machines, whether designed to operate on metal, wood, or other materials, include a cutter head, carrying a rotary or other cutter, and so supported by swingable linkage as to be universally movable, laterally in a horizontal plane over the work while the cutter operates thereon. In duplicating and reproducing machines, such lateral movements of the cutter head are controlled and actuated by a pattern-tracing stylus, through the medium of a suitable pantograph mechanism. The pantograph engraving machine of commerce, is a good example of one of the several machine types to which my invention is peculiarly adapted, although the term "engraving" is employed herein in a generic sense to include all machinery to which my invention can be adapted.

The drawings show, in part, an engraving machine of the foregoing type, wherein a vertical rotary cutter spindle 1, is adapted to hold and drive a central depending rotary cutter 2, through the medium of any suitable chuck or clamp. The cutter spindle 1, is provided with any suitable driving means for rotating the same during an engraving operation while the vertical cutter is being carried laterally by its support. In the example shown, the spindle is provided with a belt pulley 3, for driving the same, and any suitable belt drive, not shown, can be applied to this pulley for driving the same from any suitable source of power.

This cutter spindle is supported from any suitable support, such as the machine frame 4, through the medium of any suitable horizontally swingable jointed linkage, as for instance, horizontal link 5, at one end pivoted to and supported from said frame to swing horizontally on a vertical axis, and free end link or cutter head 6, at one end pivoted to and supported from the other or otherwise free end of said link 5, to swing with respect thereto on a vertical axis.

The vertical cutter spindle is carried by the cutter head 6, hence said laterally swingable end member carried laterally by and also swingable laterally with respect to the intermediate link 5, is termed the cutter head as it carries the cutter spindle and its mounting and casing or housing. In this example, the vertical cutter spindle is carried by and located in the outer or free end of said laterally swingable free end head 6, and hence said spindle and its mounting are included in the cutter head.

In the example shown, the head 6, provides a lower rigid arm 6a, projecting laterally from and rigid with the main body of the head and at its outer or free end forming a vertical hollow housing or hub in which the vertical cutter spindle and its mountings and casing are received and held. This head also provides a rigid upper arm 6b, arranged above lateral arm 6a, and projecting laterally from and rigid with the main body of the head. The free end of the upper arm 6b, is adapted to be pivotally coupled to the pantograph mechanism, not shown, on a vertical axis alined with the vertical axis of the rotary cutter spindle, so that as the pantograph is swung horizontally as its stylus traces the pattern or master copy, the cutter head through the medium of said vertical axis connection with the pantograph, will be correspondingly swung laterally over the work, in the scaled relation determined by the pantograph setting or adjustment.

In the particular example shown, the linkage including the cutter head 6, carried thereby, is so formed, joined, arranged, and hung from the frame with respect to the area of the work on the work table to be engraved or otherwise operated on that the linkage will fold, expand, and swing to permit movement of the cutter in any lateral direction to all portions of said area, under the actuating force and control of the operating vertical axis from the pantograph to the upper arm 6b, of the cutter head, as heretofore commonly employed in the art or otherwise.

This cutter head supporting linkage is commonly more or less heavy and massive to prevent sagging of the cutter head and reduce cutter vibration to the minimum and to assure accuracy of cutter operation.

In this example, the supporting frame 4, is formed with laterally projecting, rigid, strong, parallel upper and lower linkage-supporting lugs 7, 8, spaced apart vertically a distance to freely receive the pivoted or inner end of link 5, between the lugs. The lower lug 8, is formed with a vertical cylindrical socket 8a, opening through the flat top face of the lug and depending in the lug for a portion of its depth, with a relatively small hole 8b, extending vertically through the under face of the lug and opening centrally through the flat floor of socket 8a. A steel or hard metal cylindrical cup 9, is pressed down in said socket with its flat bottom seated on the socket floor, with the flat horizontal top edge of the upstanding flange of the cup located a distance below the open top of the socket, to abut the lower end of the outer race ring of a bearing and hence limit the downward movement thereof in the socket.

The upper supporting lug 7, forms a hub 7a, having a relatively large vertical cylindrical bore, the longitudinal axis of which is alined with the vertical longitudinal axis of the socket 8a, in the lower lug 8.

The hub 7a, formed by lug 7, is vertically split to form a split clamp, having projecting ears 7b, perforated to receive clamping bolt 10, by which the hub 7a, can be contracted and permitted to expand.

A separate vertically-adjustable, removable, longitudinally-elongated, cylindrical, metal, bearing plug or block 11, extends vertically through the bore of the split hub 7a, and is normally rigidly held by said hub in the desired vertical position in longitudinal alinement with the lower socket 8a. This block or plug is preferably formed with a smooth cylindrical surface throughout its length. The downwardly projecting lower end of plug 11, provides a cylindrical vertical socket 11a, opening downwardly through the bottom end face of the plug, corresponding to and vertically alined with the bottom socket 8a, and provides an interior downwardly facing annular ledge 11b, to limit the upward movement of the outer race ring of a ball bearing seated in said socket 11a.

The inner or supporting end of link 5, that is located between the frame lugs 7, 8, is provided with two strong, rigid, longitudinally-alined, vertical studs or trunnions 12, one projecting upwardly from the top of the link and the other depending from the bottom of the link, to cooperate with bearings provided by the block 11, and the bottom supporting lug 8, in pivotally supporting the arm 5, and the load carried thereby, from the lugs 7, 8, against sagging, while permitting horizontal swing on the vertical axis defined by said studs. These projecting studs 12, are preferably cylindrical and of uniform diameter throughout their lengths.

I prefer to provide cylindrical studs 12, with radial and end thrust roller bearings 13, therefor seated and held centered by and in the socket of block 11, and in the socket of lug 8, say, substantially as shown.

For instance, I show rolling, such as roller or ball, bearing 13, centered in socket 8a, with its outer race ring seated on the top of the cylindrical flange of cup 9, and rolling bearing 13, centered and seated in socket 11a, with its outer race ring seated on shoulder 11b.

The lower stud 12, of arm 5, is fitted approximately full length in the inner race ring of the lower rolling bearing 13, in lug 8, to rotate therewith. The rolling bearing 13, in the top block 11, is fitted approximately onto the top of the link 5, with its inner race ring on the upper stud 12, to rotate therewith.

In the particular example shown, the inner or supporting end of the link 5, body or casting, provides a vertical hub, having a cylindrical vertical bore 5a, or hole extending therethrough with its longitudinal axis accurately perpendicular to the horizontal axis of the link. The two studs 12, of said secured end of the link are formed by the upper and lower projecting ends of two hard metal cylindrical spindles 5b, of uniform diameter throughout their length, and driven into said bore 5a, from opposite ends thereof and permanently held therein, to provide a rigid, accurate permanent economical structure.

The outer or free end of the link 5, is also formed with a vertical end hub having an accurate cylindrical, vertical hole or bore 5c, the longitudinal axis of which is accurately parallel with the longitudinal axis of the bore 5a, from which studs 12, project. Two hard metal uniformly cylindrical spindles 5d, corresponding to the spindles 5b, are permanently driven into the bore 5c, from opposite ends thereof, to provide said free end of the link 5, with vertical alined permanent cylindrical top and bottom studs 15, 15, the same as and parallel with the studs 12. The outer or free end of link 5, is located between upper and lower horizontal lugs 16, that support the cutter head 6, and project laterally from and are rigid with the body of said head. The two lugs 16, form operatively similar hubs 16a, having vertical alined bores extending therethrough with cylindrical plain or smooth inner surfaces. The common vertical axis of these upper and lower hubs 16a, is parallel with the common axis of hub 7a, and studs 12.

The hubs 16a, are longitudinally split to constitute split ring clamps, and each is provided with a clamping screw 16b, for independently contracting the hubs 16a, and permitting the same to expand. Each hub 16a, being operatively like hub 7a, and each receives and is adapted to clamp and hold a vertical cylindrical plug or block 17, operatively similar to the block 11.

The cylindrical blocks 17, extend through the split hubs 16a, and each is removable from and applicable to its respective hub, and each can, when its hub is expanded, be pushed in either direction therein, to the exact elevation desired and can then be rigidly clamped in the desired adjustment by tightening the hub clamping bolt 16b.

The studs 15, are pivotally mounted in or to the blocks 17, for relative horizontal swinging movement between link 5, and head 6, on a vertical axis, i. e. that of the studs 15, parallel with the axis of studs 12. I prefer to mount the studs 15, in the blocks 17, through the medium of radial and end thrust rolling bearings. For instance, the facing ends of the blocks 17, are formed with cylindrical center longitudinal end sockets 17a, to snugly receive the outer race rings of rolling bearings 18, seated against internal annular ledges 17b, with the studs 15, snugly fitting in the inner race rings of bearings 18, which bear end-wise against the top and bottom faces of the link 5.

To assemble the link 5, with the supporting lugs 7, 8, of the frame, and the interposed link supporting bearings; the cup 9, is seated to its limit down in the socket 8a, of lower frame lug 8; a ball bearing 13, is pushed onto the lower stud 12, until its inner race ring abuts the bottom face of link 5; the end of link 5, is then located between the frame lugs 7, 8, (the block 11, being absent from the upper split hub 7a, which is in expanded position) and when its studs 12, are alined with the longitudinal axis of bottom socket 8a, the ball bearing 13 on the bottom stud 12, is, by the annular bottom surface of link 5, surrounding stud 12, pressed down into socket 8a, and seated on washer 9; then, while the link is in horizontal position with the common axis of studs 12, vertical and alined with the vertical axis of the seated bottom ball bearing 13, the upper ball bearing is forced onto the upper stud 12, and seated against the top surface of link 5; then, the block 11, is applied down through the bore of the expanded hub 7a, and pushed down on the upper bearing 13, on top stud 12, to seat the outer race ring of said bearing in socket 11a, against ledge 11b, and to apply the desired tension to both ball bearings, and finally, the split hub 7a, is tightly contracted by clamping screw 10, to rigidly lock the block 11.

The pivotal connection between the link 5, and the supporting lugs 7, 8, can be as easily disassembled, by operating clamping screw 10, permit expansion of the split hub 7a, and upward removal of the block 11, from upper stud 12, thereupon permit upward movement of link 5, to release its lower stud 12, from lug 8.

The assembly and dis-assembly of the link and frame lugs 7, 8, is accomplished while the studs 12, remain as permanent parts of the link 5. The mounted end of the link 5, is held against lateral and vertical rocking movements by the studs and roller bearings centered and seated within the sockets 8a, 11a, and against vertical adjustment by the bottom stud and roller bearing in open top socket 8a, in the lug 8, and the washer 9, therein, while the arm is held against upward movement by the clamped block 11.

The desired vertical adjustments of the cutter head are attained, not by adjusting the link 5, with respect to the frame lugs, but by adjusting the cutter head vertically on and with respect to the link 5. This is possible of easy accomplishment, by loosening the clamping screws 16b, to cause slight expansion of both split hubs 16a, and permit the two hubs 16a, to slide longitudinally on the two blocks 17, as the cutter head is bodily moved up or down, with respect to link 5, to the exact elevation desired, whereupon the two hubs can be tightened by screws 16b, to rigidly lock the cutter head in the desired vertical adjustment.

The cutter head and link 5, are also assembled and dis-assembled easily, and without requiring pulling or removal of the studs 15, said studs remaining as permanent parts of link 5.

In assembling the cutter head and link 5, the ball bearings 18, can be first properly seated on the studs 15, against the upper and lower edges of the link 5, and then the cutter head can be positioned to bring the link end between the upper and lower lugs 16, of the head with the blocks 17, previously loosened in split heads 16a, and pushed outwardly therein from the path of the studs 15. When the head has been positioned on the link end with the blocks centered above and below the studs, the blocks are moved longitudinally toward the studs to press the blocks longitudinally onto the outer race rings of bearings 18, until both bearings are properly seated in the sockets 17a. Thereupon, the cutter head is adjusted to the required elevation, and the two split hubs are contracted by their screws 16b, to rigidly lock the blocks 17. The cutter head can be as easily separated from the link 5.

The pivotal connection between the link 5, and main frame is economical in first cost as well as in upkeep and the same is true of the pivotal connection between the cutter head and link, and these connections are simple and effective in maintaining the pivotal axes parallel and the parts against sagging, and gain material advantages and reduction of costs by reason of the ease of assembly and separation.

The utilization of the fixed more or less heavy lower lug 8, permanently rigid with the main frame, as the main or lower support for the linkage organization, tends to maintain permanency of the horizontal plane to which the swing of link 5, is limited, and also the exterior compactness of said lug is desirable as it presents no projections liable to limit the inward swing of the cutter head by contacting the free end thereof. Under certain conditions and situations, however, it is desirable to provide a relatively large diameter block 11, and clamping means therefor, such as block 11, and split hum 7a, say, mounted on a lower lug, such as 8, for the lower bearing and support for link 5, arranged and operating as do the block 11 and split hub 7a, forming the upper bearing for link 5. If so desired, the several studs 12, 15, can be provided with lubricant ducts 5b, 5d, respectively, extending throughout the lengths thereof, and open at their outer ends to supply the adjacent ball bearings and at their inner ends opening into central unoccupied portions of the bores 5a, 5c, in which the studs 12, 15, are fixed.

Material advantages in reducing production costs, and in the accuracy of operation and ease of adjustment of the assembled organization, are gained by providing the large diameter bores through the hubs 7a, 16a, having plain or smooth surfaces to receive the plain or smooth-surfaced plugs or blocks 11, 17. These large diameter bores or holes can be drilled or bored inexpensively and with great accuracy, and the large diameter blocks or plugs can be inexpensively produced with accuracy, and can with accuracy, be assembled with the respective hubs to accurately maintain the cutter head to lateral swing in the required plane.

What I claim is:—

1. A bearing organization for supporting the laterally swingable jointed linkage associated with a machine tool device, including a pivotal joint having a vertical axis, said joint embodying alined vertically spaced upper and lower vertical clamping hubs rigid with one member; vertically elongated alined slide blocks normally rigidly clamped in said hubs, respectively, and adapted for longitudinal sliding adjustment with respect thereto when said hubs are loosened thereon; radial and end thrust rolling bearings in the adjacent ends of said blocks, respectively; and alined vertical studs rigid with another member and fitted and centered in said bearings in said blocks, respectively, whereby when said hubs are loosened, one of said members can be bodily raised or lowered by relative longitudinal sliding movement between said two hubs and said two blocks held by said bearings and studs, and then secured at the adjusted elevation by clamping the blocks to the hubs.

2. A bearing structure for the jointed linkage of a machine tool device, including two members jointed together for relative horizontal movement on a vertical axis, one of said members having two hubs rigid therewith and vertically spaced apart, each hub having a smooth wall vertical bore extending therethrough longitudinally of said axis, each hub longitudinally split and provided with manually-actuated means controlling the expansion and contraction thereof; longitudinally-elongated slide blocks extending through said bores, respectively, and adapted to be rigidly held by said hubs when contracted thereon, and to slide longitudinally in said bores when said hubs are expanded; the other member having an end portion arranged between said two hubs and of vertical thickness less than the vertical spacing between the hubs; and means pivotally mounting said end portion of said other member to the adjacent ends of said blocks against relative radial and end thrusts for relative axial movements on said vertical axis, whereby when said hubs are expanded, one member can be vertically adjusted relatively to the other, with relative longitudinal sliding movements between the two hubs and the two blocks longitudinally of said vertical axis, said blocks being endwise removable from and applicable to said hubs, and being separable longitudinally of said axis from said pivotal mounting means, for assembly and disassembly of said two members.

3. A bearing structure for the jointed linkage supporting means of a machine tool device, said supporting means including two members jointed together for relative horizontal movement on a vertical axis, one of said members provided with projecting studs alined with said axis, the other of said members having hubs rigid therewith and widely spaced apart vertically to extend over and below said studs; said hubs having vertical bores alined with said studs and said axis, longitudinally-elongated slide blocks longitudinally arranged in said bores and endwise removable therefrom and applicable thereto and adapted for longitudinal sliding adjustment therein; means for normally rigidly securing each hub and its block together and for releasing said blocks and said hubs for relative longitudinally sliding adjustment; and end and radial thrust bearing units concentric with said axis and located between said one member and the adjacent ends of said blocks and centered on said studs and in said block ends; said studs and blocks being separable when said blocks are released in said hubs, by sliding movement of the blocks longitudinally of said axis in directions away from the studs and bearing units.

4. A bearing structure for supporting the jointed linkage of a machine tool head, including two members joined for relative horizontal movement on a vertical axis, one of said members provided with studs rigid therewith alined with said axis, the other of said members having hubs rigid therewith and spaced apart vertically to extend above and below said studs and the adjacent portion of said one member; the vertical thickness of said adjacent portion of said one member being substantially less than the vertical spacing between said hubs to permit relative vertical adjustment of one member with respect to the other member, each hub having a vertical bore extending therethrough, longitudinally-elongated slide blocks alined with said axis and extending through said bores, respectively, for relative longitudinal sliding adjustment between the hubs and blocks, and means for normally rigidly securing each block to its said hub in the relative longitudinal position to which adjusted therein, said studs being journaled to said blocks against radial and end thrusts and for relative rotary movement on said axis, whereby said head can be vertically adjusted to the desired horizontal plane by vertically moving one member with respect to the other longitudinally of said axis, when said blocks are released from said hubs for sliding therein, with relative longitudinal sliding movement between the pair of blocks and the pair of hubs.

5. A bearing structure for the jointed linkage support of a machine tool device, embodying a supporting joint between two members of said support providing for relative lateral swing on a vertical axis, said joint including vertically-spaced hubs rigid with one of said members, and having vertical bores alined with said axis; elongated alined slide blocks arranged in said bores and longitudinally slidable therein and normally rigidly held by said hubs; means for normally holding said blocks in fixed positions in their hubs, said other member projecting between said hubs; and means establishing pivotal mountings between the inner ends of said blocks and said other member for relative rotary movement on said vertical axis, said means including studs alined with said axis; and upper and lower end and radial thrust bearing units centered on said studs and fitted between and abutting said block ends and said other member, said units being held against relative lateral movement with respect to said blocks and said other member.

6. A bearing structure for supporting the jointed linkage means of a machine tool device, including two members jointed together for relative horizontal movement on a vertical axis, said means providing upper and lower vertically spaced projections rigid with one of said members, at least one of said projections having a vertical bore extending therethrough longitudinally of said axis, a longitudinally-elongated vertical slide block normally rigidly held in said bore and abnormally adapted for endwise application to and removal from said bore and for longitudinal sliding adjustment in said bore; means for normally holding said block in said bore in the longitudinal position to which adjusted and for releasing the same; an end of the other member being arranged between said projections; and radial and end thrust supporting bearing units concentric with said axis, and each including relatively rotatable inner and outer race rings and intervening rolling bearings maintaining said rings against longitudinal separation, said units fitted in operative supporting and vertical axis-forming relation to and between said member end and the adjacent block end and to and between said member end and the other projection, respectively, said units held to said block, member end and projection against relative lateral movements, and in alinement with said vertical axis.

7. A bearing organization for the laterally-swingable jointed linkage of a machine tool device, including two members, one having upper and lower lugs forming hubs with alined vertical longitudinal bores; elongated slide blocks extending through said bores, respectively; and longitudinally slidable therein and removable therefrom; and means for independently clamping each block in its hub; the complementary end of the other member being arranged between said blocks and provided with alined upwardly and downwardly projecting rigid studs journaled in said blocks, respectively, whereby when said hubs are loosened on said blocks, one member can be bodily moved vertically with relatively longitudinal sliding movements between the two hubs and the two blocks while the two blocks are held by the studs, and the adjusted member can then be held at the elevation to which adjusted by clamping the hubs to their respective blocks.

GEORGE GORTON.